United States Patent Office 2,820,650
Patented Jan. 21, 1958

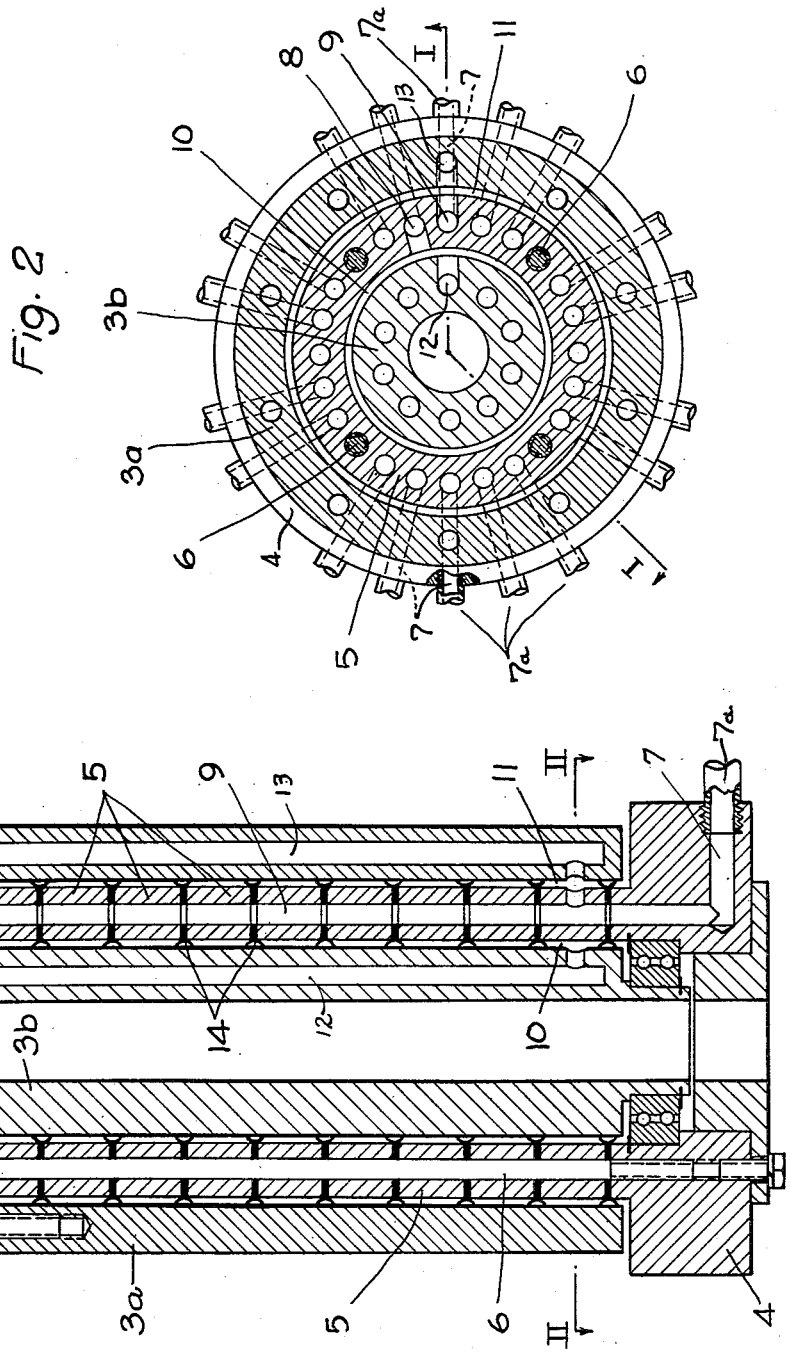

2,820,650

MULTIPLE CONDUIT ROTARY UNION

Alfred-Rudolf Leopold, Hannover, Neustadt am Rubenberge, Germany, assignor to Westinghouse Bremsen-Gesellschaft, m. b. H., Hannover, Germany Application August 24, 1953, Serial No. 376,203

Claims priority, application Germany September 4, 1952

4 Claims. (Cl. 285—134)

This invention relates to a rotary fluid seal union device for maintaining sealed communication between corresponding passages in two relatively-rotatable members.

This invention, more particularly, relates to such a union device in which the seal connection of the pressure passages in the two relatively-rotatable members is accomplished by means of a plurality of annular elements or rings arranged in cooperation with said members so that communication between the pressure passages is provided by a series of separate, parallel, annular pressure chambers arranged along the same axis. The number of these annular chambers, according to practice in the prior art, was equal to the number of pressure passages which were joined through the rotary union. Thus, by reason of the fact that the length of the rotary union increased proportionately as the number of passages connected through the rotary union increased, previously known rotary unions of that type have been impracticable, in some cases, because of insufficient space available for the installation of such a union; as in the case, for example, on pneumatically or hydraulically controlled cranes, excavators, etc., where clearance space between the upper part of the vehicle and the lower part of the vehicle is limited.

According to this invention, two or more rows of radially spaced-apart, annular, pressure chambers are arranged concentric to each other by rotary communication of this type. Thereby, the axial length of the rotary union can be reduced to a half or a fraction of the length otherwise required.

According to a practical construction of this invention, one of the relatively-rotatable members of the rotary union comprises a body built as a double hollow cylinder, one cylinder of which encompasses the other and is coaxial therewith, and each of which cylinders contain axial passages that are connected, by means of radial ports, with a double series of coaxial, annular pressure chambers which are spaced-apart radialwise and are formed by radial clearance between the coaxial cylinders and a series of aligned rings forming a cylinder secured to the other of the relatively-rotatable members and disposed coaxially within the outer cylinder and in encirclement of the inner cylinder portions of the double cylinder.

Preferably, the concentric annular pressure chambers are separated one from the other along their common axis by a plurality of coaxially-arranged, parallel, annular seals interleaved between the rings and extending radially into rotatable sealing engagement with the inner wall of the outer cylinder and the outer wall of the inner cylinder.

The individual rings, in addition to having drilled holes for accommodating stay bolts to hold them together and secure them to the respective one of the relatively-rotatable members, have as many drilled holes, extending in an axial direction and spaced-apart circumferentially therein, as there are pressure passages connected through the rotary union. In addition, each individual ring has two radially-extending ports for connection to respective ones of the axial through holes; namely a port to the inner annular chamber and a port to the outer annular chamber, so that each ring makes the connection for two separate axially-extending pressure passages via the inner and outer annular chambers associated with each ring, from out of which passages the further flow of the pressure medium moves through the respective passages in the inner and outer cylinders to the pressure ports therein. A typical design of the invention is shown on the accompanying drawing wherein:

Fig. 1 is a cross-sectional view, taken along the offset cut line I—I of Fig. 2, and Fig. 2 is a cross-sectional view, taken on the line II—II of Fig. 1.

As shown in the drawing, the rotary union consists of two parallel revolvable parts 3 and 4. Part 3 is constructed as a double cylinder consisting of outer and inner coaxial cylinders 3a, 3b between which is disposed a portion of ring part 4. Such portion consists, in the illustrated example, of nine rings 5 which are joined together by means of four stay bolts 6 extending through aligned openings in said rings. The ring part 4, including the assembled rings 5, contains twenty pressure passages, eighteen of which are connected via connection ports 7 (shown in Fig. 2) to respective pipes 7a and two are closed off. Ring 5, which is illustrated in the cut shown in Fig. 2, indicates that passages 8 and 9 are open to the inner and outer ring peripheries, respectively, thus axial passage 8 is connected with inner annular pressure chamber 10, and axial passage 9 is connected with outer annular pressure chamber 11. Respective radial passages lead from the annular pressure chambers 10 and 11 to respective axial passages 12 and 13 in the inner and outer coaxial cylinders 3a and 3b. In these cylinders, via such passages therein, the pressure medium is lead to the connecting ports 12a and 13a.

The individual rings 5 are sealed parallelly by means of the annular seals 14.

Having now described my invention, what I claim as new and desire to secure by Letters Patent, is:

1. A rotary seal device comprising a first member and a second member, one member being rotatable relative to the other and each member having a plurality of fluid pressure passages for respective connection with the corresponding passages in the other; a pair of radially spaced-apart coaxial cylinder elements attached to said first member, each having a plurality of passages extending in an axial direction therein connected to respective passages in said first member; a hollow cylinder element attached to said second member and extending coaxially between the radially spaced-apart cylinder elements in radially spaced-apart relationship with respect to each to form inner and outer concentric annular clearance-ways open to respective passages in said coaxial cylinder elements at the inner and outer peripheries, respectively, of said hollow cylinder element, said hollow cylinder element having a plurality of axially-extending passages therein connected to corresponding passages in said second member, some of said passages in the hollow cylinder element being open to the inner annular clearance-way and others being open to the outer annular clearance-way; and radially-extending rotary sealing means cooperable with the hollow cylinder element and with the pair of cylinder elements to form fluid pressure seals separating longitudinal sections of said inner and outer annular clearance-ways into a plurality of annular chambers into which respective passages in said hollow cylinder element are individually connected.

2. A rotary seal device comprising two relatively rotatable members, a series of aligned annular elements arranged axially next to one another and secured to one of said members, casing means secured to the other of said members and cooperating with inner and outer peripheral surfaces of said annular elements to provide radialwise inner and outer annular chambers exposed to said surfaces, and a plurality of annular sealing rings interposed coaxially between said annular elements, respectively, and cooperable with said casing means for fluid pressure separation of said annular chambers axialwise, said casing means having a plurality of passages opening radialwise into respective ones of said inner and outer annular chambers and adapted for fluid pressure connection with means exterior of said device, and said series of annular elements having axially-extending passages therein opening radialwise into respective ones of said inner and outer annular chambers and adapted for fluid pressure connection with means exterior of said device.

3. A rotary union for providing a fluid pressure connection between two relatively rotatable members, said union comprising three annular cylindrical elements of different diameters respectively and arranged in coaxially aligned concentric spaced relation to one another so as to provide two concentric annular spaces between the intermediate one of said cylindrical elements and the outer and inner cylindrical elements respectively, the intermediate cylindrical element being rotatable with one of said members and the outer and the inner cylindrical elements being rotatable with the other of said two members, sealing rings carried by the intermediate cylindrical element in coaxially spaced relation for engagement with the inner and outer cylindrical elements to provide a series of coaxially arranged concentric pairs of annular chambers, and a plurality of pairs of fluid pressure conducting passages one of each pair of which is in the intermediate cylindrical element and the other of which is in one of the other cylindrical elements, said passages of each pair being connected to the same respective annular chamber so that continuous fluid pressure communication between the two passages is thereby maintained notwithstanding relative rotation of said two members.

4. A rotary seal device comprising a first element having formed therein radially spaced apart coaxial cylindrical surfaces defining radialwise inner and outer walls of an annular cavity, and a pair of fluid pressure passages adapted for individual connection to respective external conduits and open through said inner and outer walls respectively; a hollow cylinder element having coaxial radially spaced apart cylindrical surfaces disposed coaxially within said cavity with radial clearance from its said inner and outer walls and rotatably connected to said first element for relative turning movement therebetween about the axis common to said hollow cylinder element and to said cavity, said hollow cylinder element having a pair of fluid pressure passages individually connected to respective external conduits and open through its said radially spaced apart cylindrical surfaces, respectively; and rotary sealing means cooperable with said first element and with said hollow cylinder element to define, therebetween, the end walls of radially spaced apart fluid tight coaxial annular chambers via which the fluid pressure passages in said first element are in fluid pressure communication, respectively, with the fluid pressure passages in said hollow cylinder element.

References Cited in the file of this patent
UNITED STATES PATENTS

| | | |
|---|---|---|
| 304,443 | Morrison | Sept. 2, 1884 |
| 872,358 | Liddle | Dec. 3, 1907 |
| 2,458,343 | Carleton | Jan. 4, 1949 |
| 2,662,785 | Fawick | Dec. 15, 1953 |
| 2,663,264 | Michalitsianos | Dec. 22, 1953 |